(12) United States Patent
Jung et al.

(10) Patent No.: US 10,942,883 B2
(45) Date of Patent: *Mar. 9, 2021

(54) DATA TRANSMISSION CIRCUIT FOR OPERATING A DATA BUS INVERSION, AND A SEMICONDUCTOR APPARATUS AND A SEMICONDUCTOR SYSTEM INCLUDING THE SAME

(71) Applicant: SK hynix Inc., Icheon-si (KR)

(72) Inventors: Hae Kang Jung, Gwangmyeong-si (KR); Hong Joo Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,339

(22) Filed: Jan. 17, 2020

(65) Prior Publication Data
US 2020/0151135 A1 May 14, 2020

Related U.S. Application Data

(63) Continuation of application No. 16/012,501, filed on Jun. 19, 2018, now Pat. No. 10,572,431.

(30) Foreign Application Priority Data

Sep. 12, 2017 (KR) .................. 10-2017-0116550

(51) Int. Cl.
*G06F 13/42* (2006.01)
*G06F 13/40* (2006.01)
*G06F 13/16* (2006.01)
*H04L 25/49* (2006.01)
*G06F 11/10* (2006.01)
*H04L 25/14* (2006.01)

(52) U.S. Cl.
CPC .......... *G06F 13/4072* (2013.01); *G06F 11/10* (2013.01); *G06F 13/1657* (2013.01); *G06F 13/4022* (2013.01); *G06F 13/4217* (2013.01); *G06F 13/4221* (2013.01); *G06F 13/4234* (2013.01); *H04L 25/14* (2013.01); *H04L 25/4915* (2013.01)

(58) Field of Classification Search
CPC ............. G06F 13/4072; G06F 13/4217; G06F 13/4234; G06F 13/4221; G06F 13/1657; G06F 11/10; G06F 13/4022; H04L 25/4915
See application file for complete search history.

(56) References Cited

U.S. PATENT DOCUMENTS

| | | | | |
|---|---|---|---|---|
| 7,280,412 B2* | 10/2007 | Jang | ..................... | G11C 7/1006 326/26 |
| 7,522,073 B1* | 4/2009 | Kao | ....................... | H03M 5/145 341/55 |
| 7,530,004 B1* | 5/2009 | Weaver | ............. | H04L 25/03038 370/201 |
| 9,529,749 B2* | 12/2016 | Hollis | .................. | G06F 13/4286 |

(Continued)

*Primary Examiner* — Jing-Yih Shyu
(74) *Attorney, Agent, or Firm* — William Park & Associates Ltd.

(57) ABSTRACT

A data transmission circuit includes a data bus inversion encoding circuit configured to compare previous output data and current output data, invert or non-invert the current output data to control the number of data transitions; and transmitters configured to drive signal transmission lines based on outputs of the data bus inversion encoding circuit.

17 Claims, 6 Drawing Sheets

(56) References Cited

U.S. PATENT DOCUMENTS

| | | | |
|---|---|---|---|
| 2005/0088395 A1* | 4/2005 | Chung | G09G 3/3688 |
| | | | 345/98 |
| 2006/0109933 A1* | 5/2006 | Lee | H04L 25/4915 |
| | | | 375/308 |
| 2008/0162778 A1* | 7/2008 | Choi | G06F 13/4217 |
| | | | 711/100 |
| 2010/0199017 A1* | 8/2010 | Hollis | G06F 11/2005 |
| | | | 710/316 |
| 2016/0162434 A1 | 6/2016 | Mozak et al. | |
| 2016/0173134 A1* | 6/2016 | Kwon | G06F 13/4221 |
| | | | 714/777 |
| 2017/0060806 A1* | 3/2017 | Kudekar | G06F 13/4221 |
| 2018/0277175 A1* | 9/2018 | Kondo | G06F 13/4022 |
| 2018/0285304 A1* | 10/2018 | Kozhikkottu | G06F 13/36 |

* cited by examiner

DATA TRANSMISSION CIRCUIT FOR OPERATING A DATA BUS INVERSION, AND A SEMICONDUCTOR APPARATUS AND A SEMICONDUCTOR SYSTEM INCLUDING THE SAME

CROSS-REFERENCES TO RELATED APPLICATION

The present application is a continuation application of U.S. patent application Ser. No. 16/012,501, filed on Jun. 19, 2018, issued as U.S. Pat. No. 10,572,431 on Feb. 25, 2020, and claims priority under 35 U.S.C. § 119(a) to Korean application number 10-2017-0116550, filed on Sep. 12, 2017, in the Korean Intellectual Property Office, which is incorporated herein by reference in its entirety.

BACKGROUND

1. Technical Field

Various embodiments generally relate to a semiconductor technology, and, more particularly, to a data transmission circuit, and a semiconductor apparatus and a semiconductor system including the data transmission circuit.

2. Related Art

Electronic apparatuses may consist of a large number of electronic components. Among the electronic apparatuses, a computer system may consist of many electronic components which are constructed by semiconductors. Semiconductor apparatuses which construct a computer system may transmit data in synchronization with a clock, and perform serial communication. Currently, computer systems and semiconductor apparatuses tend to be developed toward a high speed operation and low power consumption. As the operating speed of a system is increased, the speed of a clock and a data transmission speed are gradually increased, and, as a system consumes low power, the amplitudes of the clock and data are decreased. If a data transmission speed increases and an amplitude decreases, the valid window and/or duration of data decreases, and thus it may become difficult to perform precise data communication. Therefore, research on a data transmission method capable of accurately transmitting data at a high speed in conformity with recent technology trends are being actively conducted.

SUMMARY

In an embodiment, a data transmission circuit may be provided. The data transmission circuit may include a data bus inversion encoding circuit configured to compare previous output data and current output data, and invert or non-invert the current output data to control the number of data transitions. The data transmission circuit may include transmitters configured to drive signal transmission lines based on outputs of the data bus inversion encoding circuit.

In an embodiment, a semiconductor system may be provided. The semiconductor system may include a data transmission circuit configured to generate a current inversion control signal by comparing previous output data and current output data to control the number of data transitions, and output transmission data by inverting or non-inverting the current output data based on the current inversion control signal. The semiconductor system may include a data receiving circuit configured to receive the transmission data and the current inversion control signal from signal transmission lines, and generate received data.

DETAILED DESCRIPTION

Hereinafter, a data transmission circuit, and a semiconductor apparatus and a semiconductor system using the same will be described below with reference to the accompanying drawings through various examples of embodiments.

Various embodiments may be directed to a data transmission circuit capable of performing a data bus inversion operation such that data may transition as much as possible, and a semiconductor apparatus and a semiconductor system using the same.

Figure 1:
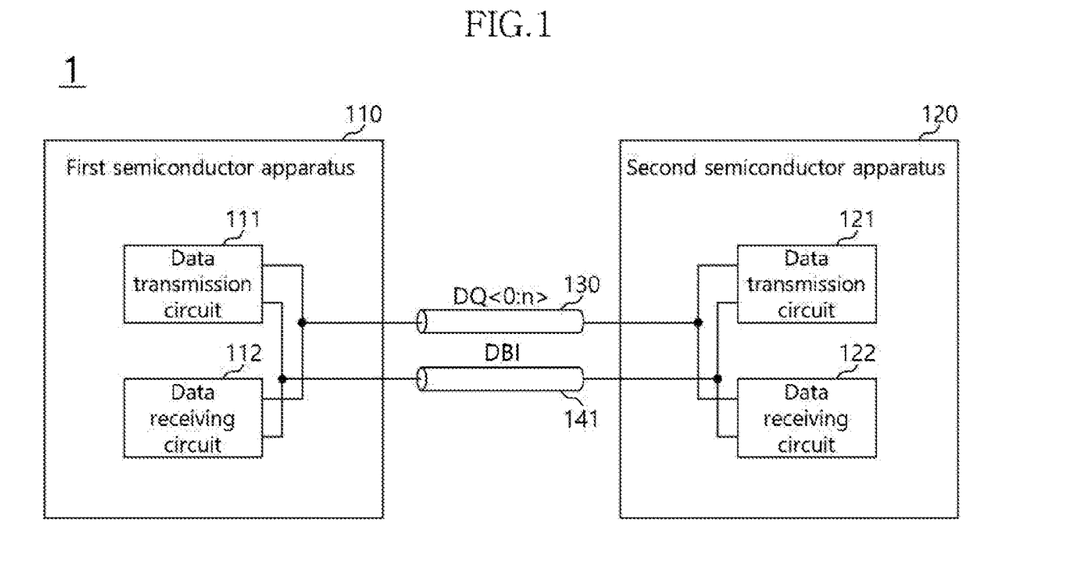
FIG. 1 is a diagram illustrating a representation of an example of the configuration of a semiconductor system in accordance with an embodiment.

FIG. 1 is a diagram illustrating a representation of an example of the configuration of a semiconductor system 1 in accordance with an embodiment. In FIG. 1, the semiconductor system 1 may include a first semiconductor apparatus 110 and a second semiconductor apparatus 120. The first semiconductor apparatus 110 and the second semiconductor apparatus 120 may be electronic components which communicate with each other. In an embodiment, the first semiconductor apparatus 110 may be a master apparatus, and the second semiconductor apparatus 120 may be a slave apparatus which operates by being controlled by the first semiconductor apparatus 110. For example, the first semiconductor apparatus 110 may be a host apparatus such as a processor or a controller, and may include a central processing unit (CPU), a graphic processing unit (GPU), a multimedia processor (MMP), a digital signal processor (DSP) or a memory controller. Further, the first semiconductor apparatus 110 may be realized in the form of a system-on-chip by combining processor chips having various functions, such as application processors (AP). The second semiconductor apparatus 120 may be a memory apparatus, and the memory apparatus may include a volatile memory or a nonvolatile memory. The volatile memory may include an SRAM (static RAM), a DRAM (dynamic RAM) or an SDRAM (synchronous DRAM), and the nonvolatile memory may include a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) or an FRAM (ferroelectric RAM).

The first semiconductor apparatus 110 and the second semiconductor apparatus 120 may include data transmission circuits 111 and 121 and data receiving circuits 112 and 122. The data transmission circuit 111 may transmit data DQ<0:n> to the second semiconductor apparatus 120 based on the internal data of the first semiconductor apparatus 110, and the data receiving circuit 122 may receive the data DQ<0:n> transmitted from the first semiconductor apparatus 110. The data transmission circuit 121 may transmit data DQ<0:n> to the first semiconductor apparatus 110 based on the internal data of the second semiconductor apparatus 120, and the data receiving circuit 112 may receive the data DQ<0:n> transmitted from the second semiconductor apparatus 120. The data transmission circuit 111 may transmit an inversion control signal DBI to the second semiconductor apparatus 120 when transmitting the data DQ<0:n> to the second semiconductor apparatus 120, and the data receiving circuit 122 may receive the inversion control signal DBI transmitted from the first semiconductor apparatus 110. The data transmission circuit 121 may transmit an inversion control signal DBI to the first semiconductor apparatus 110 when transmitting the data DQ<0:n> to the first semiconductor apparatus 110, and the data receiving circuit 112 may receive the inversion control signal DBI transmitted from the second semiconductor apparatus 120. The data transmission circuit 111 and the data transmission circuit 121 may have substantially the same structure, and the data receiving circuit 112 and the data receiving circuit 122 may have substantially the same structure. An operation in which the data DQ<0:n> and the inversion control signal DBI are transmitted from the first semiconductor apparatus 110 to the second semiconductor apparatus 120 may be a write operation, and an operation in which the data DQ<0:n> and the inversion control signal DBI are transmitted from the second semiconductor apparatus 120 to the first semiconductor apparatus 110 may be a read operation.

When data is transmitted from the first semiconductor apparatus 110 to the second semiconductor apparatus 120, the data transmission circuit 111 may generate the inversion control signal DBI by comparing previously outputted data and currently outputted data, and may invert or non-invert the currently outputted data based on the inversion control signal DBI and output the inverted or non-inverted data. The data transmission circuit 111 may generate the inversion control signal DBI such that the number of data transitions becomes a maximum, and may invert or non-invert the currently outputted data such that the number of data transitions becomes a maximum. The number of data transitions may be determined by comparing the levels of the previously outputted data and the levels of the currently outputted data. The data receiving circuit 122 may receive the data DQ<0:n> and the inversion control signal DBI transmitted from the data transmission circuit 111, and may invert or non-invert the data DQ<0:n> transmitted from the data transmission circuit 111, based on the inversion control signal DBI. When data are transmitted from the second semiconductor apparatus 120 to the first semiconductor apparatus 110, the data transmission circuit 121 may generate the inversion control signal DBI by comparing previously outputted data and currently outputted data, and may invert or non-invert the currently outputted data based on the inversion control signal DBI and output the inverted or non-inverted data. The data transmission circuit 121 may generate the inversion control signal DBI such that the number of data transitions becomes a maximum, and may invert or non-invert the currently outputted data such that the number of data transitions becomes a maximum. The data receiving circuit 112 may receive the data DQ<0:n> and the inversion control signal DBI transmitted from the data transmission circuit 121, and may invert or non-invert the data DQ<0:n> transmitted from the data transmission circuit 121, based on the inversion control signal DBI.

The first and second semiconductor apparatuses 110 and 120 may be coupled through signal transmission lines. In FIG. 1, the signal transmission lines may include a data bus 130 and a data inversion bus 141. The data bus 130 may transmit the data DQ<0:n> from the first semiconductor apparatus 110 to the second semiconductor apparatus 120 by being driven by the data transmission circuit 111, or may transmit the data DQ<0:n> from the second semiconductor apparatus 120 to the first semiconductor apparatus 110 by being driven by the data transmission circuit 121. The data inversion bus 141 may transmit the inversion control signal DBI from the first semiconductor apparatus 110 to the second semiconductor apparatus 120, or may transmit the inversion control signal DBI from the second semiconductor apparatus 120 to the first semiconductor apparatus 110. While not shown, the signal transmission lines may further include a command bus, an address bus and a clock bus. The first semiconductor apparatus 110 may transmit various control signals through the command bus, the address bus and the clock bus to control the operation of the second semiconductor apparatus 120. A command signal may be transmitted through the command bus, an address signal may be transmitted through the address bus, and a clock signal may be transmitted through the clock bus.

Figure 2:
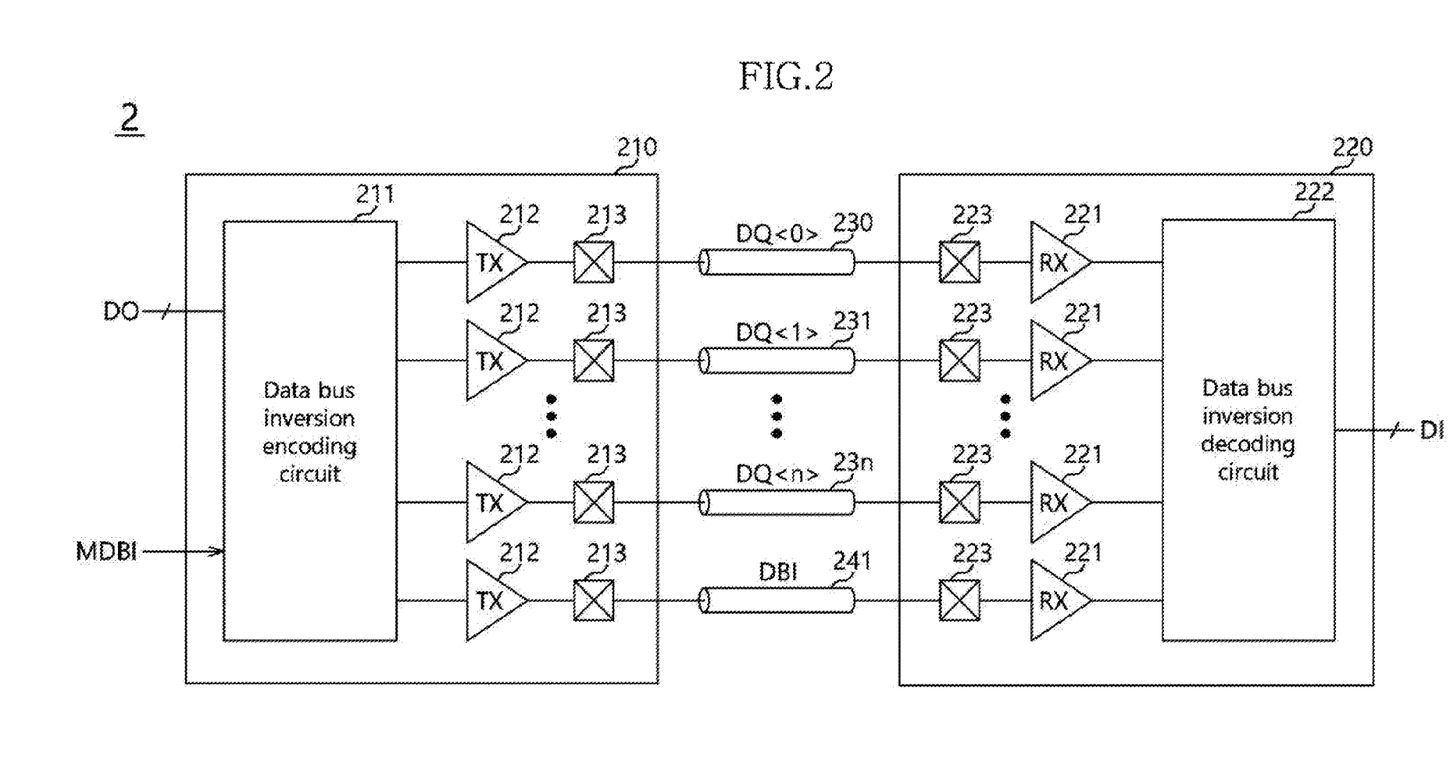
FIG. 2 is a diagram illustrating a representation of an example of the configuration of a semiconductor system in accordance with an embodiment.

FIG. 2 is a diagram illustrating a representation of an example of the configuration of a semiconductor system 2 in accordance with an embodiment. In FIG. 2, the semiconductor system 2 may include a data transmission circuit 210 and a data receiving circuit 220. The data transmission circuit 210 may be applied as each of the data transmission circuits 111 and 121 illustrated in FIG. 1, and the data receiving circuit 220 may be applied as each of the data receiving circuits 112 and 122 illustrated in FIG. 1. The data transmission circuit 210 may be coupled with the data receiving circuit 220 through signal transmission lines. The data transmission circuit 210 may transmit data DQ<0:n> and an inversion control signal DBI to the data receiving circuit 220 through the signal transmission lines. For the sake of convenience in explanation, the data received by the data transmission circuit 210 may be referred to as output data DO, the data transmitted through the signal transmission lines may be referred to as transmission data DQ<0:n>, and the data outputted by the data receiving circuit 220 may be referred to as received data DI.

The data transmission circuit 210 may generate the transmission data DQ<0:n> by performing a data bus inversion operation for the output data DO. The data transmission circuit 210 may generate the transmission data DQ<0:n> by inverting or non-inverting the output data DO. The data transmission circuit 210 may perform the data bus inversion operation in a direction capable of maintaining the voltage levels of the signal transmission lines at predetermined levels. For example, the predetermined levels may have levels corresponding to the middles of the swing widths of the transmission data DQ<0:n> and the inversion control signal DBI transmitted through the signal transmission lines.

As will be described later, the predetermined levels may correspond to the termination voltage levels of the signal transmission lines. The data transmission circuit 210 may generate the inversion control signal DBI by comparing previous output data and current output data and invert or non-invert the current output data such that the number of data transitions becomes a maximum. The previous output data may mean the output data DO previously outputted by the data transmission circuit 210, and the current output data may mean the output data DO outputted next to the previous output data by the data transmission circuit 210. The output data DO may be a data stream which includes a plurality of bits. The previous output data may be output data DO of a previous turn, and the current output data may be output data DO of a turn next to the previous output data. The number of data transitions may mean the number of current output data of which levels transition when compared to previous output data. For example, when previous output data have the levels of 0, 0, 0, 0, 1, 1, 1, 1 and current output data have the levels of 1, 1, 1, 1, 0, 0, 0, 0, the number of data transitions may be a maximum of 8. Conversely, when previous output data have the levels of 0, 0, 0, 0, 1, 1, 1, 1 and current output data have the levels of 0, 0, 0, 0, 1, 1, 1, 1, the number of data transitions may be a minimum of 0. The smaller the number of data transitions is, the more signal transmission lines maintain the same levels. Further, the larger the number of data transitions there are, the more signal transmission lines toggle or transition to the other levels. Therefore, the smaller the number of data transitions there are, the more it may be difficult for the signal transmission lines to maintain the predetermined voltage levels. Further, the larger the number of data transitions there are, the more it may be easy for the signal transmission lines to maintain the predetermined voltage levels. Thus, the data transmission circuit 210 may invert or non-invert the current output data such that the number of data transitions becomes a maximum to make it easy for the signal transmission lines to maintain the predetermined voltage levels. The data transmission circuit 210 may enable the inversion control signal DBI such that the number of data transitions becomes a maximum. The data transmission circuit 210 may enable the inversion control signal DBI to invert or non-invert the current output data such that the number of data transitions may become a maximum. For example, the data transmission circuit 210 may generate the inversion control signal DBI which is enabled, to invert the current output data such that the number of data transitions may become a maximum, and may generate the inversion control signal DBI which is disabled, to non-invert the current output data such that the number of data transitions may become a maximum.

The data transmission circuit 210 may perform two different data bus inversion modes. For example, the data transmission circuit 210 may perform a first inversion mode and a second inversion mode. The data transmission circuit 210 may operate in one of the first inversion mode and the second inversion mode by receiving an inversion mode signal MDBI. For example, the data transmission circuit 210 may operate in the second inversion mode when the inversion mode signal MDBI is disabled, and may operate in the first inversion mode when the inversion mode signal MDBI is enabled. The first inversion mode may be a data bus inversion operation in which, as described above, data are inverted or non-inverted such that the number of data transitions becomes a maximum. The second inversion mode may be a data bus inversion operation in which data are inverted or non-inverted such that the number of data transitions becomes a minimum. In the second inversion mode, the data transmission circuit 210 may reduce the toggling of the signal transmission lines and thereby reduce the power needed for the semiconductor system 2 to transmit data. In the second inversion mode, the data transmission circuit 210 may generate the inversion control signal DBI by comparing previous output data and current output data such that the number of data transitions becomes a minimum, and may invert or non-invert the current output data based on the inversion control signal DBI and output the inverted or non-inverted data.

The data receiving circuit 220 may be coupled with the signal transmission lines, and may receive the transmission data DQ<0:n> and the inversion control signal DBI transmitted through the signal transmission lines. The data receiving circuit 220 may generate the received data DI by inverting or non-inverting the transmission data DQ<0:n> based on the inversion control signal DBI. The data receiving circuit 220 may generate the received data DI by inverting the transmission data DQ<0:n> when the inversion control signal DBI which is enabled is received, and may generate the received data DI by non-inverting the transmission data DQ<0:n> when the inversion control signal DBI which is disabled is received. Therefore, the data receiving circuit 220 may generate the received data DI which have substantially the same levels as the output data DO, by inverting or non-inverting the transmission data DQ<0:n> based on the inversion control signal DBI.

In FIG. 2, the data transmission circuit 210 may include a data bus inversion encoding circuit 211 and transmitters (TX) 212. The data transmission circuit 210 may further include pads 213, and may be coupled with the signal transmission lines through the pads 213. The signal transmission lines may include a plurality of data buses 230, 231, ..., 23n and a data inversion bus 241. The plurality of data buses 230, 231, ..., 23n may be signal transmission lines through which first to (n+1)^th transmission data DQ<0:n> are transmitted. The data inversion bus 241 may be a signal transmission line through which the inversion control signal DBI is transmitted. When a data bandwidth is 8, the number of the data buses 230, 231, ..., 23n may be 8, and the number of bits of the transmission data DQ<0:n> transmitted at one time through the data buses 230, 231, ..., 23n may be 8. While it is illustrated that the bandwidth of data is 8, it is not intended that the embodiment be limited thereto.

The data bus inversion encoding circuit 211 may receive the output data DO and may determine whether to invert the output data DO. The data transmission circuit 210 may transmit, for example, 32 data, sequentially by eight data each time, through four times, through the data buses 230, 231, ..., 23n. When eight transmission data DQ<0:n> are transmitted second, eight transmission data DQ<0:n> transmitted first may be data based on previous output data, and the transmission data DQ<0:n> transmitted second may be data based on current output data. The data bus inversion encoding circuit 211 may generate the inversion control signal DBI by comparing previous output data and current output data, and may invert or non-invert the current output data based on the inversion control signal DBI and output the inverted or non-inverted data. The data bus inversion encoding circuit 211 may invert or non-invert the current output data such that the number of data transitions becomes a maximum. The transmitters 212 may drive the signal transmission lines based on the outputs of the data bus inversion encoding circuit 211. The transmitters 212 may transmit first to eighth transmission data DQ<0:n> through the data buses 230, 231, ..., 23n and transmit the inversion control signal DBI through the data inversion bus 241, based on the outputs of the data bus inversion encoding circuit 211. In FIG. 2, the data bus inversion encoding circuit 211 may further receive the inversion mode signal MDBI. The data bus inversion encoding circuit 211 may operate in one of the first inversion mode and the second inversion mode based on the inversion mode signal MDBI.

In FIG. 2, the data receiving circuit 220 may include receivers (RX) 221 and a data bus inversion decoding circuit 222. The data receiving circuit 220 may further include pads 223, and may be coupled with the signal transmission lines through the pads 223. The receivers 221 may be coupled with the data buses 230, 231, . . . , 23n and the data inversion bus 241 through the pads 223, respectively. The receivers 221 may receive the first to (n+1)^th transmission data DQ<0:n> transmitted through the data buses 230, 231, . . . , 23n and receive the inversion control signal DBI transmitted through the data inversion bus 241. The data bus inversion decoding circuit 222 may receive the outputs of the receivers 221. The data bus inversion decoding circuit 222 may invert or non-invert the outputs of the receivers 221 based on the inversion control signal DBI. The data bus inversion decoding circuit 222 may generate the received data DI by inverting or non-inverting the outputs of the receivers 221.

Figure 3:
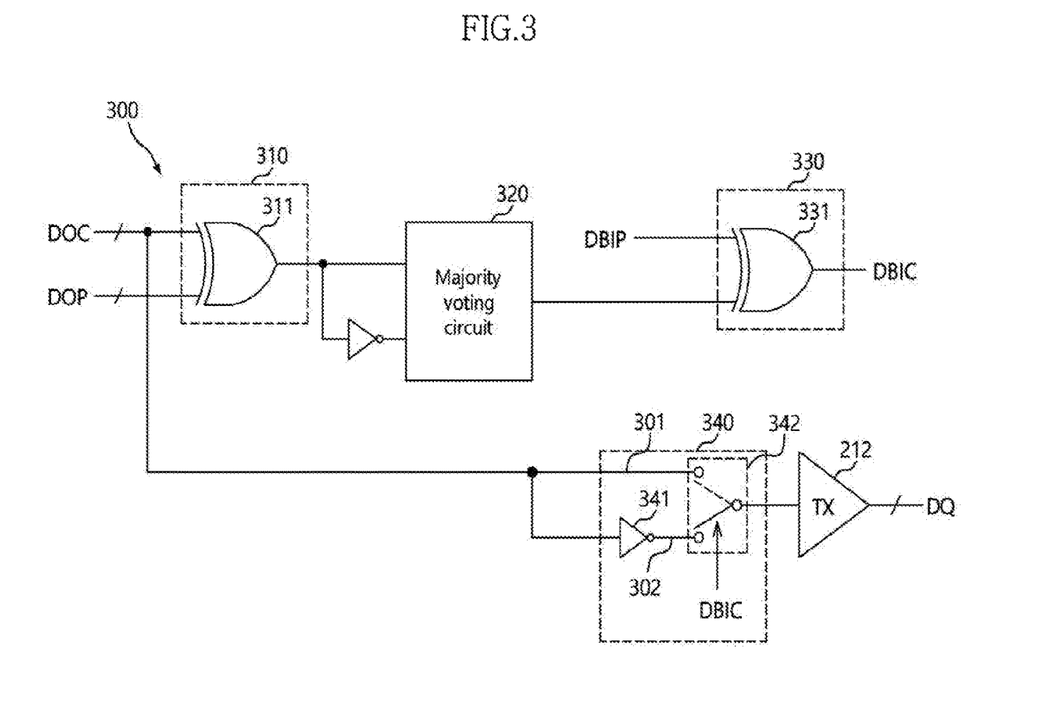
FIG. 3 is a diagram illustrating a representation of an example of a data bus inversion encoding circuit and a coupling relationship between the data bus inversion encoding circuit and transmitters in accordance with an embodiment.

FIG. 3 is a diagram illustrating a representation of an example of a data bus inversion encoding circuit 300 and a coupling relationship between the data bus inversion encoding circuit 300 and the transmitters 212 in accordance with an embodiment. The data bus inversion encoding circuit 300 may be applied as the data bus inversion encoding circuit 211 illustrated in FIG. 2. In FIG. 3, the data bus inversion encoding circuit 300 may include a comparator 310, a majority voting circuit 320, an inversion control signal generator 330 and an inversion driver 340. The comparator 310 may compare previous output data DOP and current output data DOC. For example, the comparator 310 may output a signal of a high level when the level of the previous output data DOP and the level of the current output data DOC are different, and may output a signal of a low level when the level of the previous output data DOP and the level of the current output data DOC are the same. The comparator 310 may perform an exclusive OR operation. For example the comparator 310 may include an exclusive OR gate 311. The comparator 310 may include exclusive OR gates by a number corresponding to each of the number of previous output data DOP and the number of current output data DOC. For example, when a data bandwidth is 8, the data bus inversion encoding circuit 300 may include the comparator 310 which includes eight exclusive OR gates.

The majority voting circuit 320 may receive the outputs of the comparator 310. The majority voting circuit 320 may count the number of data transitions based on the outputs of the comparator 310. The majority voting circuit 320 may decide whether the number of data transitions corresponds to the majority of a data bandwidth. For example, when each of the number of previous output data DOP and the number of current output data DOC is 8, the majority voting circuit 320 may output an output signal of a low level when the number of data transitions is equal to or greater than 4 (that is, is the majority), and generate an output signal of a high level when the number of data transitions is less than 4 (that is, is not the majority). The majority voting circuit 320 may perform a deciding operation by receiving the outputs of the comparator 310 as differential signals.

The inversion control signal generator 330 may receive the output of the majority voting circuit 320 and a previous inversion control signal DBIP, and generate a current inversion control signal DBIC. The inversion control signal generator 330 may disable the current inversion control signal DBIC to a low level when the levels of the output of the majority voting circuit 320 and the previous inversion control signal DBIP are the same, and may enable the current inversion control signal DBIC to a high level when the levels of the output of the majority voting circuit 320 and the previous inversion control signal DBIP are different. The previous inversion control signal DBIP may be an inversion control signal which is generated by comparing the previous output data DOP and output data previous to the previous output data DOP. The inversion control signal generator 330 may perform an exclusive OR operation. The inversion control signal generator 330 may include an exclusive OR gate 331. The exclusive OR gate 331 may receive the previous inversion control signal DBIP and the output of the majority voting circuit 320, and output the current inversion control signal DBIC. The current inversion control signal DBIC may be transmitted to the data receiving circuit 220 through the data inversion bus 241, as the inversion control signal DBI, by being driven by the transmitter 212.

The inversion driver 340 may receive the current output data DOC and the current inversion control signal DBIC. The inversion driver 340 may output one of non-inverted current output data 301 and inverted current output data 302 based on the current inversion control signal DBIC. For example, the inversion driver 340 may output the inverted current output data 302 when the current inversion control signal DBIC is enabled, and may output the non-inverted current output data 301 when the current inversion control signal DBIC is disabled. The inversion driver 340 may include an inverter 341 and a switch 342. The inverter 341 may invert the current output data DOC and generate the inverted current output data 302. The switch 342 may output one of the non-inverted current output data 301 and the inverted current output data 302 inverted by the inverter 341, based on the current inversion control signal DBIC. The outputs of the inversion driver 340 may be outputted as transmission data DQ through the transmitters 212.

The data bus inversion encoding circuit 300 may enable the current inversion control signal DBIC when the number of data transitions is not the majority and the previous inversion control signal DBIP is disabled. The data bus inversion encoding circuit 300 may invert the current output data DOC and output the inverted current output data 302 when the number of data transitions is not the majority and the previous output data DOP are outputted by being non-inverted. The data bus inversion encoding circuit 300 may disable the current inversion control signal DBIC when the number of data transitions is not the majority and the previous inversion control signal DBIP is enabled. The data bus inversion encoding circuit 300 may non-invert the current output data DOC and output the non-inverted current output data 301 when the number of data transitions is not the majority and the previous output data DOP are outputted by being inverted. The data bus inversion encoding circuit 300 may enable the current inversion control signal DBIC when the number of data transitions is the majority and the previous inversion control signal DBIP is enabled. The data bus inversion encoding circuit 300 may invert the current output data DOC and output the inverted current output data 302 when the number of data transitions is the majority and the previous output data DOP are outputted by being inverted. The data bus inversion encoding circuit 300 may disable the current inversion control signal DBIC when the number of data transitions is the majority and the previous inversion control signal DBIP is disabled. The data bus inversion encoding circuit 300 may non-invert the current output data DOC and output the non-inverted current output data 301 when the number of data transitions is the majority and the previous output data DOP are outputted by being non-inverted.

Figure 4:
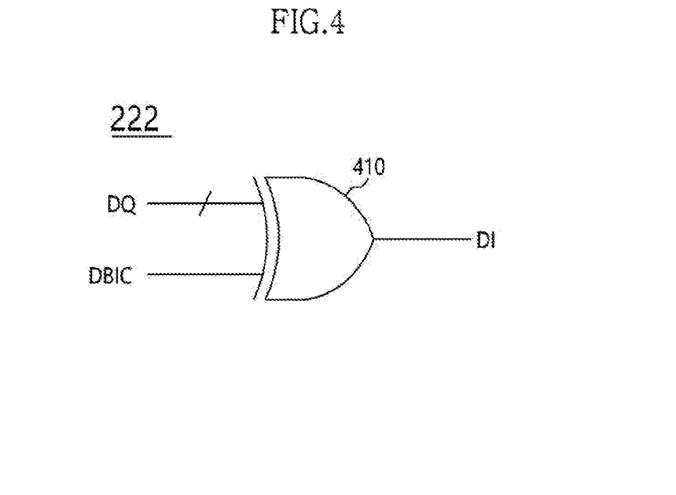
FIG. 4 is a diagram illustrating a representation of an example of the configuration of the data bus inversion decoding circuit illustrated in FIG. 2.

FIG. 4 is a diagram illustrating a representation of an example of the configuration of the data bus inversion decoding circuit 222 illustrated in FIG. 2. The data bus inversion decoding circuit 222 may receive the transmission data DQ and the current inversion control signal DBIC received by the receivers 221. The data bus inversion decoding circuit 222 may perform an exclusive OR operation. For example, the data bus inversion decoding circuit 222 may include an exclusive OR gate 410. The exclusive OR gate 410 may receive the transmission data DQ and the current inversion control signal DBIC and generate the received data DI. The data bus inversion decoding circuit 222 may non-invert the transmission data DQ and output the non-inverted transmission data as the received data DI when the current inversion control signal DBIC which is disabled to a low level is received, and may invert the transmission data DQ and output the inverted transmission data as the received data DI when the current inversion control signal DBIC which is enabled to the high level is received.

Figure 5:
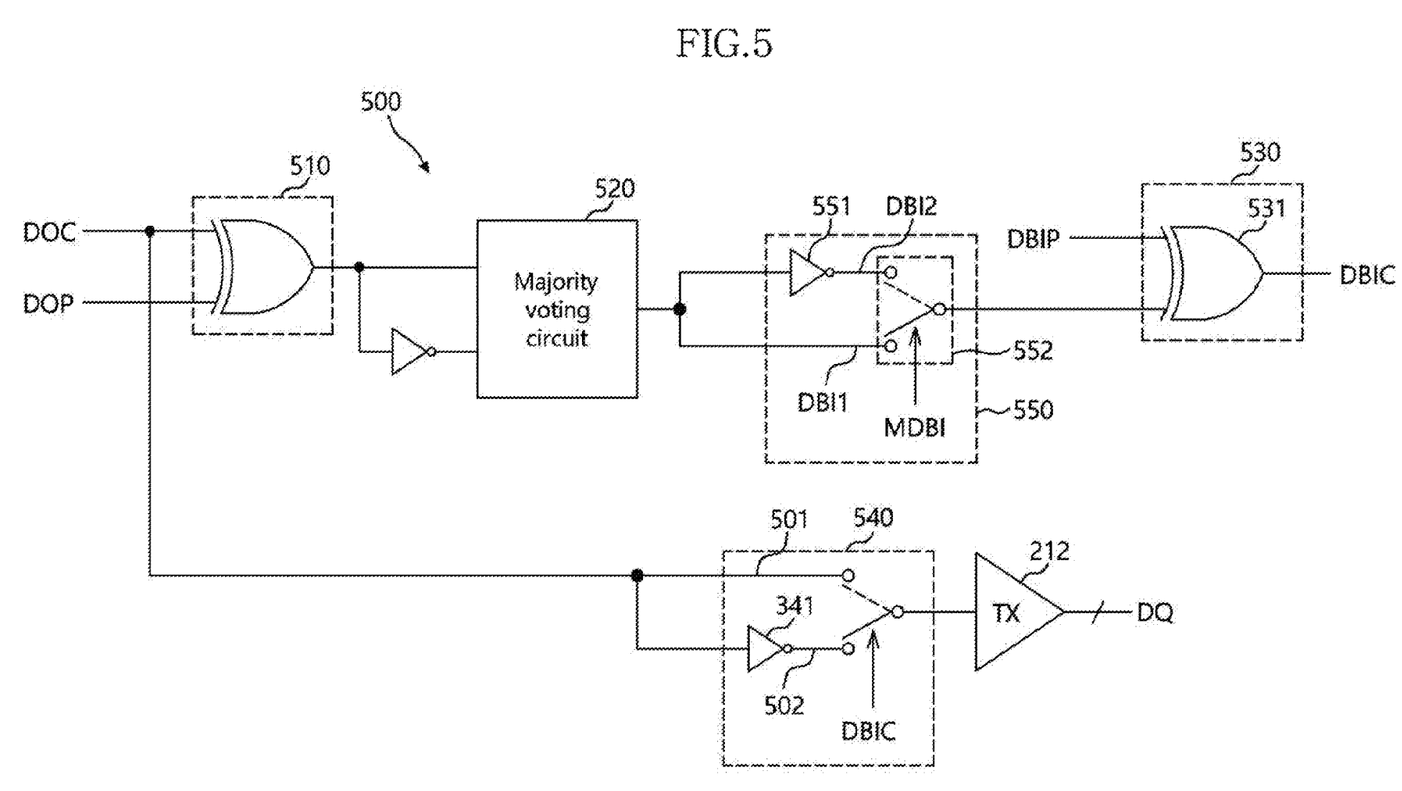
FIG. 5 is a diagram illustrating a representation of an example of a data bus inversion encoding circuit and a coupling relationship between the data bus inversion encoding circuit and transmitters in accordance with an embodiment.

FIG. 5 is a diagram illustrating a representation of an example of a data bus inversion encoding circuit 500 and a coupling relationship between the data bus inversion encoding circuit 500 and the transmitters 212 in accordance with an embodiment. The data bus inversion encoding circuit 500 may be applied as the data bus inversion encoding circuit 211 illustrated in FIG. 2. In FIG. 5, the data bus inversion encoding circuit 500 may operate in one of the first inversion mode and the second inversion mode based on the inversion mode signal MDBI. The data bus inversion encoding circuit 500 may include a comparator 510, a majority voting circuit 520, a first inversion control signal generator 550, a second inversion control signal generator 530 and an inversion driver 540. Since the comparator 510, the majority voting circuit 520 and the inversion driver 540 are substantially the same as the corresponding components of the data bus inversion encoding circuit 300 illustrated in FIG. 3, repeated descriptions thereof will be omitted herein. The first inversion control signal generator 550 may receive a first inversion control signal DBI1 and generate a second inversion control signal DBI2 based on the output of the majority voting circuit 520. The first inversion control signal generator 550 may generate the first inversion control signal DBI1 by non-inverting the output of the majority voting circuit 520, and generate the second inversion control signal DBI2 by inverting the output of the majority voting circuit 520. The first inversion control signal generator 550 may output one of the first inversion control signal DBI1 and the second inversion control signal DBI2 based on the inversion mode signal MDBI. The first inversion control signal generator 550 may output the first inversion control signal DBI1 when the inversion mode signal MDBI is enabled in the first inversion mode, and may output the second inversion control signal DBI2 when the inversion mode signal MDBI is disabled in the second inversion mode. The first inversion control signal generator 550 may include an inverter 551 and a switch 552. The inverter 551 may invert the output of the majority voting circuit 520. The switch 552 may output one of the first inversion control signal DBI1 and the second inversion control signal DBI2 by being switched by the inversion mode signal MDBI.

The second inversion control signal generator 530 may receive the output of the first inversion control signal generator 550 and a previous inversion control signal DBIP, and generate a current inversion control signal DBIC. The second inversion control signal generator 530 may perform an exclusive OR operation. For example, the second inversion control signal generator 530 may include an exclusive OR gate 531. The second inversion control signal generator 530 may generate the current inversion control signal DBIC which is disabled to the low level, when the previous inversion control signal DBIP and the output of the first inversion control signal generator 550 have the same level, and may generate the current inversion control signal DBIC which is enabled to a high level, when the previous inversion control signal DBIP and the output of the first inversion control signal generator 550 have different levels.

The operation of the semiconductor system 2 in accordance with an embodiment will be described below with reference to FIGS. 2, 4 and 5. If the inversion mode signal MDBI is enabled, the data transmission circuit 210 may operate in the first inversion mode. The data bus inversion encoding circuit 500 may count the number of data transitions by comparing the previous output data DOP and the current output data DOC. When the number of data transitions is the majority, the first inversion control signal DBI1 may be disabled based on the output of the majority voting circuit 520. The first inversion control signal generator 550 may output the disabled first inversion control signal DBI1 based on the inversion mode signal MDBI, and the second inversion control signal generator 530 may compare the first inversion control signal DBI1 and the previous inversion control signal DBIP. The second inversion control signal generator 530 may disable the current inversion control signal DBIC when the previous inversion control signal DBIP is in a disabled state. The inversion driver 540 may output non-inverted current output data 501 to the transmitters 212 based on the disabled current inversion control signal DBIC. The second inversion control signal generator 530 may enable the current inversion control signal DBIC when the previous inversion control signal DBIP is an enabled state. If the previous inversion control signal DBIP is enabled, the previous output data DOP may have been outputted as transmission data DQ by being inverted. When the previous output data DOP are outputted by being inverted as the transmission data DQ, the current output data DOC should also be outputted by being inverted. This is because, when the number of data transitions between the previous output data DOP and the current output data DOC is the majority, the number of data transitions between the inverted previous output data and the inverted current output data becomes the majority. The inversion driver 540 may output inverted current output data 502 to the transmitters 212 based on the enabled current inversion control signal DBIC. The transmitters 212 may output the outputs of the inversion driver 540 to the data buses 230, 231, . . . , 23*n* as the transmission data DQ, and may output the current inversion control signal DBIC to the data inversion bus 241. If the non-inverted or inverted current output data 501 or 502 are outputted as the transmission data DQ, the number of transitions and/or the number of toggles of the data buses 230, 231, . . . , 23*n* may become a maximum. The data receiving circuit 220 may receive the transmission data DQ and the current inversion control signal DBIC transmitted through the data buses 230, 231, . . . , 23*n* and the data inversion bus 241, through the receivers 221. The data bus inversion decoding circuit 222 may generate the received data DI by non-inverting the transmission data DQ when the disabled current inversion control signal DBIC is received. The data bus inversion decoding circuit 222 may generate the received data DI by inverting the transmission data DQ when the enabled current inversion control signal DBIC is received.

When the number of data transitions is not the majority, the first inversion control signal DBI1 may be enabled based on the output of the majority voting circuit 520. The first inversion control signal generator 550 may output the enabled first inversion control signal DBI1 based on the inversion mode signal MDBI, and the second inversion control signal generator 530 may compare the first inversion control signal DBI1 and the previous inversion control signal DBIP. The second inversion control signal generator 530 may disable the current inversion control signal DBIC when the previous inversion control signal DBIP is an enabled state. The second inversion control signal generator 530 may enable the current inversion control signal DBIC when the previous inversion control signal DBIP is a disabled state. The inversion driver 540 may output one of the non-inverted current output data 501 and the inverted current output data 502 based on the current inversion control signal DBIC.

The transmitters 212 may output the transmission data DQ based on the outputs of the inversion driver 540. The transmitters 212 may output the non-inverted current output data 501 or the inverted current output data 502 as the transmission data DQ to the data buses 230, 231, . . . , 23n, and the number of transitions and/or the number of toggles of the data buses 230, 231, . . . , 23n may become a maximum. The transmitter 212 may output the current inversion control signal DBIC to the data inversion bus 241. The data receiving circuit 220 may receive the transmission data DQ and the current inversion control signal DBIC transmitted through the data buses 230, 231, . . . , 23n and the data inversion bus 241, through the receivers 221. The data bus inversion decoding circuit 222 may generate the received data DI by inverting or non-inverting the transmission data DQ based on the current inversion control signal DBIC.

If the inversion mode signal MDBI is disabled, the data transmission circuit 210 may operate in the second inversion mode. The data bus inversion encoding circuit 500 may count the number of data transitions by comparing the previous output data DOP and the current output data DOC. When the number of data transitions is the majority, the second inversion control signal DBI2 may be enabled based on the output of the majority voting circuit 520. The first inversion control signal generator 550 may output the enabled second inversion control signal DBI2 based on the inversion mode signal MDBI. The second inversion control signal generator 530 may enable the current inversion control signal DBIC when the previous inversion control signal DBIP is a disabled state, and may disable the current inversion control signal DBIC when the previous inversion control signal DBIP is an enabled state. The inversion driver 540 may output one of the non-inverted current output data 501 and the inverted current output data 502 based on the current inversion control signal DBIC.

The transmitters 212 may output the non-inverted current output data 501 or the inverted current output data 502 as the transmission data DQ to the data buses 230, 231, . . . , 23n, and the number of transitions and/or the number of toggles of the data buses 230, 231, . . . , 23n may become a minimum. The transmitter 212 may output the current inversion control signal DBIC to the data inversion bus 241. The data receiving circuit 220 may receive the transmission data DQ and the current inversion control signal DBIC transmitted through the data buses 230, 231, . . . , 23n and the data inversion bus 241, through the receivers 221. The data bus inversion decoding circuit 222 may generate the received data DI by inverting or non-inverting the transmission data DQ based on the current inversion control signal DBIC.

When the number of data transitions is not the majority, the second inversion control signal DBI2 may be disabled based on the output of the majority voting circuit 520. The first inversion control signal generator 550 may output the disabled second inversion control signal DBI2 based on the inversion mode signal MDBI. The second inversion control signal generator 530 may disable the current inversion control signal DBIC when the previous inversion control signal DBIP is a disabled state, and may enable the current inversion control signal DBIC when the previous inversion control signal DBIP is an enabled state. The inversion driver 540 may output one of the non-inverted current output data 501 and the inverted current output data 502 based on the current inversion control signal DBIC. The transmitters 212 may output the non-inverted current output data 501 or the inverted current output data 502 as the transmission data DQ to the data buses 230, 231, . . . , 23n, and the number of transitions and/or the number of toggles of the data buses 230, 231, . . . , 23n may become a minimum. The transmitter 212 may output the current inversion control signal DBIC to the data inversion bus 241. The data receiving circuit 220 may receive the transmission data DQ and the current inversion control signal DBIC transmitted through the data buses 230, 231, . . . , 23n and the data inversion bus 241, through the receivers 221. The data bus inversion decoding circuit 222 may generate the received data DI by inverting or non-inverting the transmission data DQ based on the current inversion control signal DBIC.

Figure 6:
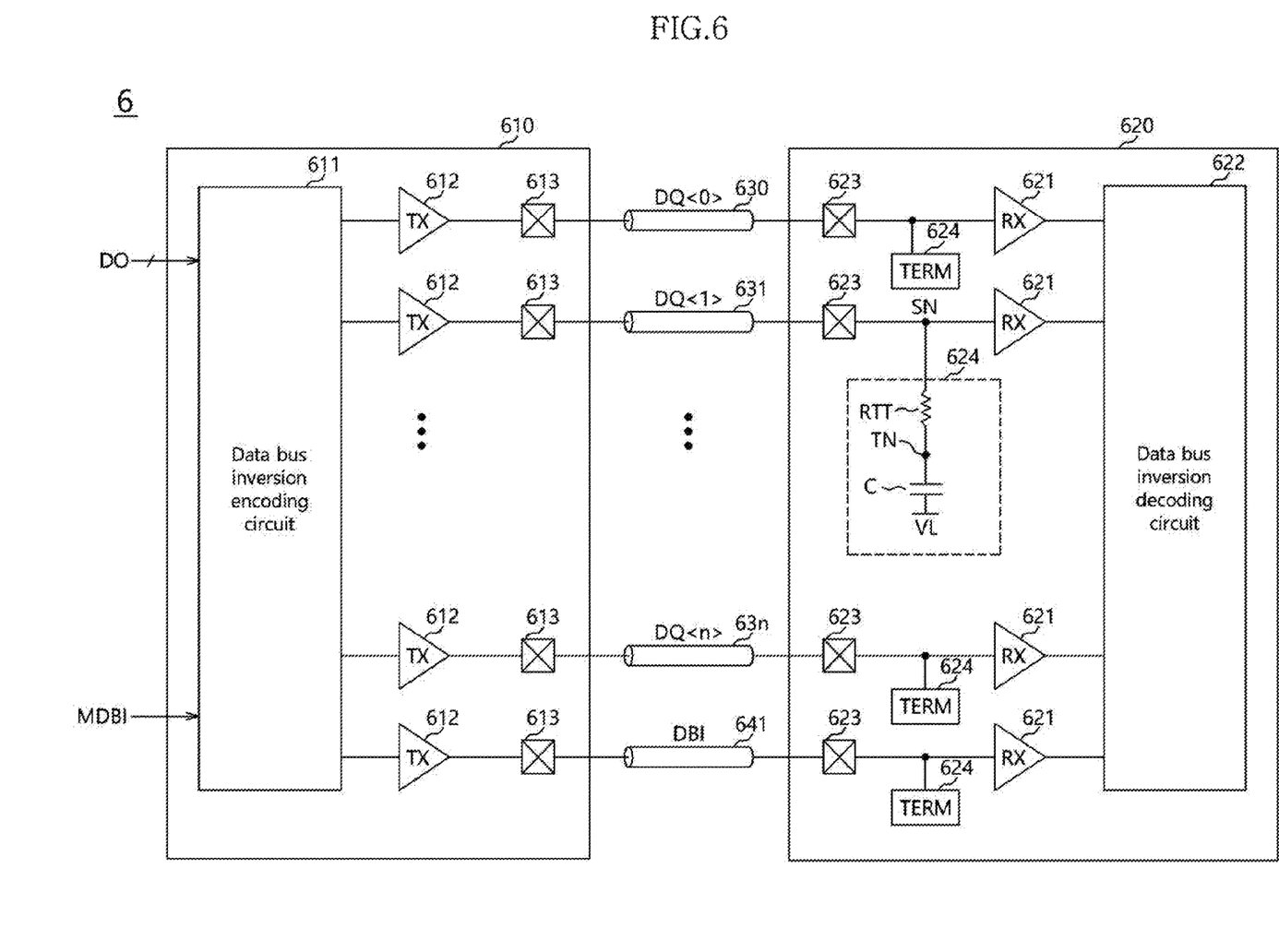
FIG. 6 is a diagram illustrating a representation of an example of the configuration of a semiconductor system in accordance with an embodiment.

FIG. 6 is a diagram illustrating a representation of an example of the configuration of a semiconductor system 6 in accordance with an embodiment. In FIG. 6, the semiconductor system 6 may include a data transmission circuit 610 and a data receiving circuit 620, and the data transmission circuit 610 and the data receiving circuit 620 may be coupled through signal transmission lines. The signal transmission lines may include data buses 630, 631, . . . , 63n through which transmission data DQ<0:n> are transmitted and a data inversion bus 641 through which an inversion control signal DBI is transmitted. The data transmission circuit 610 may include a data bus inversion encoding circuit 611, transmitters (TX) 612 and pads 613, and the data receiving circuit 620 may include pads 623, receivers (RX) 621 and a data bus inversion decoding circuit 622. The semiconductor system 6 may have substantially the same configuration as the semiconductor system 2 illustrated in FIG. 2. Repeated descriptions for the same components will be omitted herein.

In FIG. 6, the data receiving circuit 620 may further include termination circuits (TERM) 624. The termination circuits 624 may be provided by a number corresponding to the number of the signal transmission lines. The termination circuits 624 may be provided to terminate the data buses 630, 631, . . . , 63n and the data inversion bus 641. Each termination circuit 624 may implement a floating tapped termination scheme. For example, the termination circuit 624 might not use a termination voltage, and might not drive the data bus 631 by the termination voltage. The termination circuit 624 may include a termination resistor RTT and a capacitor C. The termination resistor RTT may be coupled between a receiving node SN and a termination node TN.

The capacitor C may be coupled between the termination node TN and the terminal of a low voltage VL. The low voltage VL may be, for example, a ground voltage, but it is to be noted that the embodiments are not limited thereto. The data transmission circuit 610 may transmit a balanced code, and thereby, allow the termination circuit 624 to use the floating tapped termination scheme. For example, when the level of the data DQ<1> transmitted through the data bus 631 which is coupled with the termination circuit 624 alternately has 0 and 1, the level of the data bus 631 may continuously transition from one level to the other level. Therefore, the termination mode TN may be kept at the middle voltage level of 0 and 1. However, since the data DQ<1> has a random level, it may not be transmitted as a balanced code. In the case where the termination circuit 624 uses the floating tapped termination scheme and the data DQ<1> corresponding to a balanced code is not transmitted through the data bus 631, the voltage level of the termination node TN might not keep the middle voltage level of 0 and 1, and may rise or fall in any one direction. If the voltage level of the termination node TN does not keep the middle voltage level, the receiver 621 of the data receiving circuit 620 might not accurately receive the data DQ<1> transmitted through the data bus 631. The data transmission circuit 610 and the data bus inversion encoding circuit 611 may operate in a first inversion mode, and may perform a data bus inversion operation such that the number of transitions or the number of toggles of the signal transmission lines becomes a maximum. Therefore, the data DQ<1> close to a balanced code may be transmitted through the data bus 631, and the termination node TN may easily keep the middle voltage level.

Figure 7:
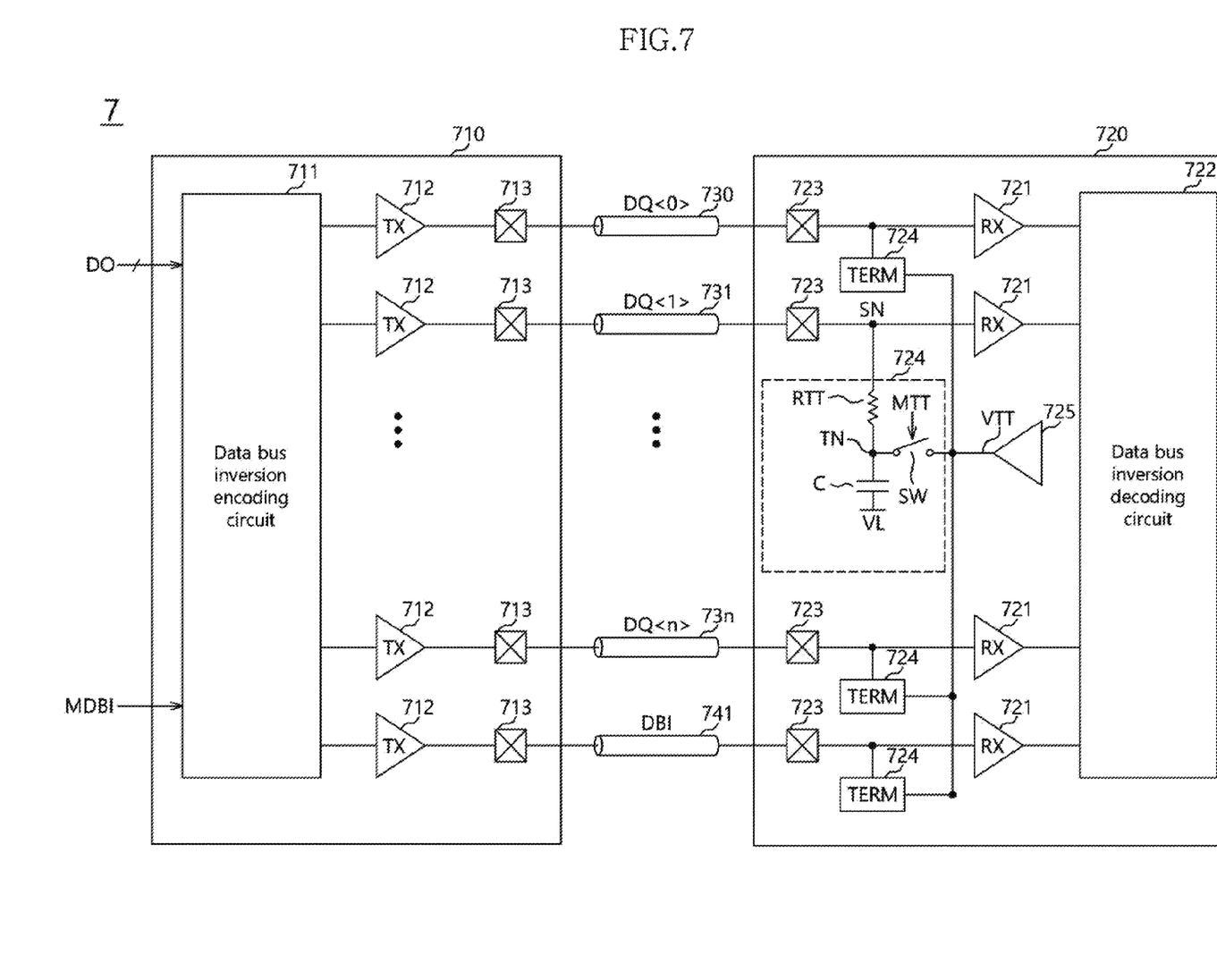
FIG. 7 is a diagram illustrating a representation of an example of the configuration of a semiconductor system in accordance with an embodiment.

FIG. 7 is a diagram illustrating a representation of an example of the configuration of a semiconductor system 7 in accordance with an embodiment. In FIG. 7, the semiconductor system 7 may include a data transmission circuit 710 and a data receiving circuit 720, and the data transmission circuit 710 and the data receiving circuit 720 may be coupled through signal transmission lines. The signal transmission lines may include data buses 730, 731, . . . , 73n through which transmission data DQ<0:n> are transmitted and a data inversion bus 741 through which an inversion control signal DBI is transmitted. The data transmission circuit 710 may include a data bus inversion encoding circuit 711, transmitters (TX) 712 and pads 713, and the data receiving circuit 720 may include pads 723, receivers (RX) 721 and a data bus inversion decoding circuit 722. The semiconductor system 7 may have substantially the same configuration as the semiconductor system 2 illustrated in FIG. 2. Repeated descriptions for the same components will be omitted herein.

In FIG. 7, the data receiving circuit 720 may further include termination circuits (TERM) 724. The termination circuits 724 may be provided by a number corresponding to the number of the signal transmission lines. The termination circuits 724 may terminate the voltage levels of the data buses 730, 731, . . . , 73n and the data inversion bus 741 to a predetermined voltage level. The predetermined voltage level may be a voltage level corresponding to a termination voltage. The termination circuits 724 may terminate the signal transmission lines based on a termination control signal MTT. The termination circuits 724 may operate in one of a first termination mode and a second termination mode based on the termination control signal MU. For example, the termination circuits 724 may terminate the signal transmission lines in a floating tapped termination scheme in the first termination mode, and may drive the signal transmission lines by a termination voltage VTT in the second termination mode. The termination voltage VTT may have the middle voltage level of the swing width of the signals transmitted through the signal transmission lines.

Each termination circuit 724 may include a termination resistor RTT and a capacitor C. One end of the termination resistor RTT may be coupled with a corresponding signal transmission line through a receiving node SN. The other end of the termination resistor RTT may be coupled with a termination node TN. One end of the capacitor C may be coupled with the termination node TN, and the other end of the capacitor C may be coupled with the terminal of a low voltage VL. The termination circuit 724 may further include a switch SW. The switch SW may selectively apply the termination voltage VTT to the termination node TN based on the termination control signal MU. The switch SW might not apply the termination voltage VTT to the termination node TN in the first termination mode, and may apply the termination voltage VTT to the termination node TN in the second termination mode. For example, in the first termination mode, the termination control signal MU may be disabled and the switch SW may be turned off. In the second termination mode, the termination control signal MU may be enabled and the switch SW may be turned on. The data receiving circuit 720 may further include a termination voltage generator 725. The termination voltage generator 725 may generate the termination voltage VTT, and may supply the termination voltage VTT.

In the first termination mode, the termination circuit 724 may perform a floating tapped termination operation and may not supply the termination voltage VTT to the termination node TN. The data transmission circuit 710 and the data bus inversion encoding circuit 711 may operate in a first inversion mode, and may perform a data bus inversion operation such that the number of transitions or the number of toggles of the signal transmission lines becomes a maximum. Therefore, data close to a balanced code may be transmitted through the signal transmission line, and the termination node TN may be kept at the middle voltage level. In the case where the termination node TN does not keep the middle voltage level even though data close to a balanced code is transmitted, the termination circuit 724 may operate in the second termination mode. The termination circuit 724 may forcibly keep the voltage level of the termination node TN at the level of the termination voltage VTT such that the receiver 721 of the data receiving circuit 720 may accurately receive a signal.

In the second termination mode, the termination circuit 724 may terminate the signal transmission line to the level of the termination voltage VTT such that the semiconductor system 7 may perform communication at a high speed. At this time, the data transmission circuit 710 and the data bus inversion encoding circuit 711 may operate in a second inversion mode, and may perform a data bus inversion operation such that the number of transitions or the number of toggles of the signal transmission lines becomes a minimum. Since the signal transmission line is terminated to the level of the termination voltage VTT in the second termination mode, the data transmission circuit 710 and the data bus inversion encoding circuit 711 may operate in the second inversion mode, and may perform a data bus inversion operation such that the number of transitions or the number of toggles of the signal transmission lines becomes a minimum, whereby power consumed when a signal is transmitted through the signal transmission line may be minimized.

While various embodiments have been described above, it will be understood to those skilled in the art that the embodiments described are examples only. Accordingly, the data transmission circuit, and the semiconductor apparatus and the semiconductor system using the same described herein should not be limited based on the described embodiments.

What is claimed is:

1. A data transmission circuit comprising:
a data bus inversion encoding circuit configured to compare a plurality of previous output data and a plurality of current output data to generate an inversion control signal, and inverts the plurality of current output data when the number of data transitions is not a majority of a data bandwidth, and non-inverts the plurality of current output when the number of data transitions is the majority of the data bandwidth; and
transmitters configured to drive signal transmission lines based on outputs of the data bus inversion encoding circuit.

2. The data transmission circuit according to claim 1, wherein the data bus inversion encoding circuit inverts or non-inverts the plurality of current output data based on the number of data transitions and whether the plurality of previous output data are outputted by being inverted.

3. The data transmission circuit according to claim 2, wherein the data bus inversion encoding circuit inverts the plurality of current output data and outputs inverted data when the number of data transitions is not a majority and the plurality of previous output data are outputted by being non-inverted.

4. The data transmission circuit according to claim 2, wherein the data bus inversion encoding circuit non-inverts the plurality of current output data and outputs non-inverted data when the number of data transitions is not a majority and the plurality of previous output data are outputted by being inverted.

5. The data transmission circuit according to claim 2, wherein the data bus inversion encoding circuit inverts the plurality of current output data and outputs inverted data when the number of data transitions is a majority and the plurality of previous output data are outputted by being inverted.

6. The data transmission circuit according to claim 2, wherein the data bus inversion encoding circuit non-inverts the plurality of current output data and outputs non-inverted data when the number of data transitions is a majority and the plurality of previous output data are outputted by being non-inverted.

7. A semiconductor system comprising:
a data transmission circuit configured to compare previous output data and current output data to generate a current inversion control signal based on whether a number of data transitions corresponds to a majority of a data bandwidth and output transmission data to signal transmission lines by inverting or non-inverting the current output data based on the current inversion control signal, such that the voltage levels of the signals transmission lines are maintained at predetermined voltage levels; and
a data receiving circuit configured to terminate the signal transmission lines with floating tapped termination circuits and to receive the transmission data and the current inversion control signal to generate received data.

8. The semiconductor system according to claim 7, wherein the data transmission circuit is configured to generate the current inversion control signal so that the number of the data transitions becomes a maximum.

9. The semiconductor system according to claim 7, wherein the data transmission circuit comprises:
a data bus inversion encoding circuit configured to invert or non-invert the current output data based on the number of data transitions and whether the previous output data are outputted by being inverted; and
transmitters configured to transmit the transmission data and the current inversion control signal based on outputs of the data bus inversion encoding circuit.

10. The semiconductor system according to claim 7, wherein the data receiving circuit comprises:
receivers configured to receive the transmission data and the current inversion control signal; and
a data bus inversion decoding circuit configured to generate the received data by inverting or non-inverting outputs of the receivers based on the current inversion control signal.

11. The semiconductor system according to claim 7, wherein each of the floating tapped termination circuits comprises a termination resistor coupled to a corresponding signal transmission line.

12. The semiconductor system according to claim 11, wherein the each of the floating tapped termination circuits further comprises a switch configured to selectively apply a termination voltage to the termination resistor based on a termination control signal.

13. The semiconductor system according to claim 12, wherein the termination voltage having a voltage level corresponding to the predetermined voltage level, and the predetermined voltage level correspond to a middle level of a swing width of a signal transmitted through the signal transmission line.

14. The semiconductor system according to claim 12, wherein the data receiving circuit further comprises a termination voltage generator which generates the termination voltage.

15. A semiconductor system comprising:
a data transmission circuit configured to compare previous output data and current output data to generate an inversion control signal, and to output transmission data by inverting or non-inverting the current output data based on the inversion control signal, such that a number of toggles of signal transmission lines through which the current output data is transmitted becomes a maximum; and
a data receiving circuit configured to terminate the signal transmission lines, and to receive the transmission data and the inversion control signal to generate received data,
wherein the data receiving circuit selectively drives the signal transmission lines by a termination voltage based on whether the signal transmission lines maintains predetermined voltage levels.

16. The semiconductor system according to claim 15, wherein the data receiving circuit does not drive the signal transmission lines by the termination voltage when the signal transmission lines maintain the predetermined voltage levels, and
the data receiving circuit drives the signal transmission lines by the termination voltage when the signal transmission lines do not maintain the predetermined voltage levels.

17. The semiconductor system according to claim 15, wherein the data receiving circuit comprises termination circuits coupled to the signal transmission lines, each termination circuit comprises:
- a termination resistor having one end which is coupled with a corresponding signal transmission line; and
- a switch configured to selectively apply the termination voltage to the other end of the termination resistor based on a termination control signal.

* * * * *